G. H. PEAL.
NON-REFILLABLE TEA BALL.
APPLICATION FILED JULY 23, 1914.
1,209,484.
Patented Dec. 19, 1916.
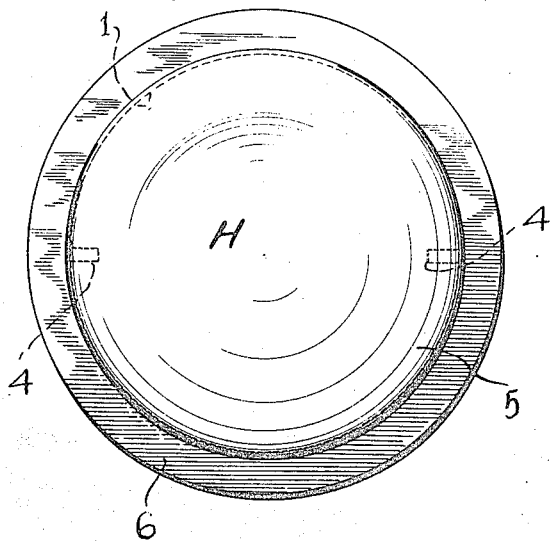
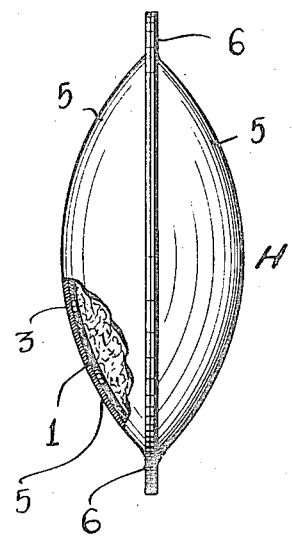
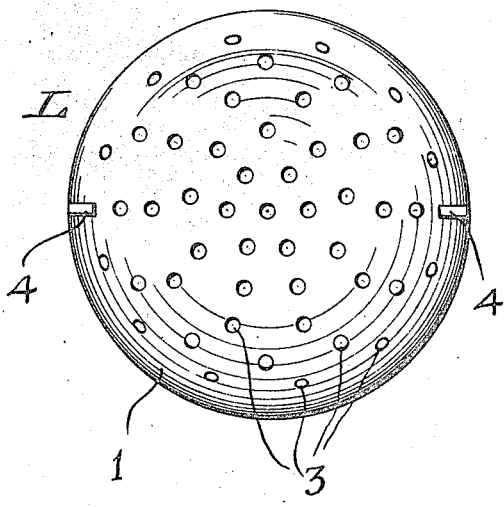
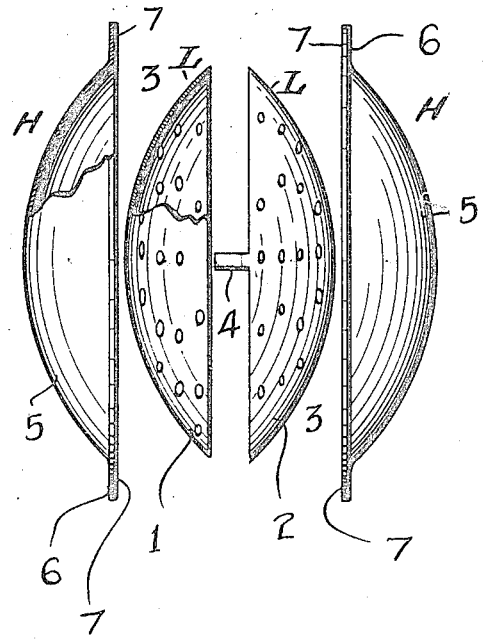
WITNESSES
INVENTOR
George H. Peal
BY
his ATTORNEYS

UNITED STATES PATENT OFFICE.

GEORGE H. PEAL, OF RUTHERFORD, NEW JERSEY.

NON-REFILLABLE TEA-BALL.

1,209,484.      Specification of Letters Patent.      Patented Dec. 19, 1916.

Application filed July 23, 1914. Serial No. 852,560.

*To all whom it may concern:*

Be it known that I, GEORGE H. PEAL, a citizen of the United States of America, residing at the city of Rutherford, county of Bergen, State of New Jersey, have invented certain new and useful Improvements in Non-Refillable Tea-Balls, of which the following is a specification.

This invention relates to a non-refillable tea ball, and the object thereof is to provide a tea ball adapted to contain a sufficient quantity of tea for a single brewing, it being intended that the tea ball or package shall be discarded after a single use.

Although it is primarily intended that the tea ball contain only sufficient tea for a single cup, it nevertheless will be understood that the tea ball may be enlarged so as to contain any amount of tea. The principle in each instance will be the same, namely, that once the package is opened and the tea ball utilized for making a brewing, the package cannot be again returned to its former condition for repeated use.

A further object is to provide a tea ball or package made up of an inner container and an outer container, the inner container being adapted to directly receive the tea to be brewed and to carry the tea into the brewing pot, it being formed of perforated or porous material to facilitate the brewing, and the outer container serving as a sealing or protecting element for closing the perforations or pores of the inner container to preserve the quality of the tea, and to prevent the sifting of tea through said perforations, and for guarding the inner container against contamination from outside influences, during such time as the device is not being used for brewing, and the outer container being of such nature that when once opened, as in preparation for brewing, it cannot be again readily returned to its previous condition.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention: Figure 1 is a plan view of a completed tea ball constructed in accordance with the provisions of this invention. Fig. 2 is an edge view of the structure shown in Fig. 1. Fig. 3 is a plan view of the inner container as the same appears with the outer container removed; and Fig. 4 is a view similar to that shown in Fig. 2, but the various parts of the structure being shown disassembled and in position to be assembled.

Referring to the drawings for a detailed description of the structure which is illustrated therein, the reference character L indicates the inner container and the reference character H indicates the outer container. The inner container is made up of two halves as 1 and 2. This may be made of any suitable material, but is preferably formed from thin sheet metal properly prepared to prevent corrosion and being preferably sterilized.

The reference numeral 3 indicates perforations formed through the material of the halves 1 and 2 for facilitating the brewing.

In order to hold the halves 1 and 2 together, a suitable number of tongues 4 are provided, said tongues being adapted to form an interlocking engagement between the halves. It is intended that these tongues shall be of such a nature as to be fully capable of holding the halves together, but that they shall be incapable of being bent to release the halves and again bent to re-connect the halves. They are intended to be of such fragile nature that they will break rather than stand such double bending. If necessary, they may be scored or otherwise treated to accomplish this result. It may be noted that in case any one of the tongues should break under the double bending, the remainder would be ineffective to retain the halves together.

The outer container H is preferably shaped so as to fit snugly over the inner container. For this purpose it may be made of two halves, as 5—5, said halves being formed with flanges 6 for engaging together. A suitable adhesive may be provided upon the surfaces 7 of the flanges for sealing said flanges together.

The snug fit of the halves 5—5 over the surface of the inner container, as clearly seen in Fig. 2, enables the halves 5—5 to efficiently close the pores or perforations in the inner container. The tea is therefore prevented from sifting through said perforations. The quality of the tea is preserved, and the inner container is maintained clean and free from contamination from outside influences.

In this form of package the outer container may be of any convenient size and of any suitable material, though I prefer to make the container of paper. When it is to be used the paper envelop is torn off and the tea ball immersed in hot water in a manner well understood in the art. The adhesive 7 holding the flanges 6 together make it impracticable to release said flanges from each other without destroying or badly defacing the same.

I thus provide a strong package within which to vend tea, accompanied by means for using the same in an approved manner and by the outer container I seal the perforations in the tea ball so that the contents may not be shaken out into the outer container and by hermetically sealing the outer container I exclude dampness or other atmospheric conditions which are detrimental to that sensitive product tea leaves. I make the binding tongues of fragile material so that with their destruction the tea ball will become useless, for it is my purpose that it should be used but once. My device has the advantage that the consumer is assured that the tea is presented for use in a sanitary condition as it is neither exposed nor handled from the place where it is packed until it is used.

As many changes could be made in this construction without departing from the scope of the following claims, it is intended that all matter contained in the above description or shown in the accompanying drawing shall be interpreted as illustrative only and not in a limiting sense.

What I claim is:

1. As an article of manufacture, a non-refillable tea package adapted to contain a quantity of tea sufficient for a single brewing, said package being formed of an inner container and an outer container, the inner container being adapted to hold the tea and walls thereof being perforated to facilitate the brewing of the tea while the tea is held therein, and the outer container being detachable and having parts disposed to coöperate with the inner container to close the perforations of the inner container.

2. As an article of manufacture, a non-refillable tea package adapted to contain a quantity of tea sufficient for a single brewing, said package being formed of an inner container and an outer container, the inner container being adapted to hold the tea and the wall thereof being perforated to facilitate the brewing of the tea while the tea is held therein, the outer container being non-perforated and being disposed to cover and seal the inner container so as to prevent the brewing of the tea but being adapted to be removed to permit the brewing of the tea, and means whereby the outer container will be at least partly destroyed in being removed.

3. As an article of manufacture, a non-refillable tea package comprising an inner container and an outer container and a quantity of tea held within the inner container sufficient for a single brewing, the inner container being adapted to carry the tea into the brewing pot, the wall of said inner container being perforated to facilitate the brewing operation, and the outer container constituting a seal inclosing the inner container to preserve the inner container against contamination from outside influences and to preserve the quality of the tea, the outer container being removable when it is desired to brew the tea.

4. As an article of manufacture, a non-refillable tea package from which a single brewing of tea may be made, said package comprising three essential elements: first, a quantity of tea; second, a perforated non-refillable container for directly containing the tea and for carrying the tea into the brewing pot; and third, a sealing cover for inclosing the container to preserve the same against contamination from outside influences and to preserve the quality of the tea, said sealing cover being removable when it is desired to brew the tea.

5. As an article of manufacture, a non-refillable tea package comprising an inner container and an outer container and a quantity of tea held within the inner container sufficient for a single brewing, the inner container being adapted to carry the tea into the brewing pot, the wall thereof being perforated to facilitate the brewing operation, and the outer container constituting a seal inclosing the inner container to preserve the inner container against contamination from outside influences and to preserve the quality of the tea, and said outer container comprising a detachable paper shell having parts pasted together whereby the shell cannot be detached except by partial destruction thereof.

Signed by me at the city of New York, New York, this 21st day of July, 1914.

GEORGE H. PEAL.

Witnesses:
EDWARD H. MERRITT,
CHARLES D. EDWARDS.